US012576803B2

(12) United States Patent
Dörfler et al.

(10) Patent No.: US 12,576,803 B2
(45) Date of Patent: Mar. 17, 2026

(54) METHOD FOR CONTROLLING TWO OR MORE COMFORT FUNCTIONS OF A VEHICLE AND VEHICLE DEVICE

(71) Applicant: Gentherm Präzision SE, Treuchtlingen (DE)

(72) Inventors: Erich Dörfler, Treuchtlingen (DE); Jürgen Baumgartl, Treuchtlingen (DE); Klaus Beetz, Weissenburg (DE)

(73) Assignee: Gentherm Präzision SE, Treuchtlingen (DE)

( * ) Notice: Subject to any disclaimer, the term of this patent is extended or adjusted under 35 U.S.C. 154(b) by 148 days.

(21) Appl. No.: 18/467,180

(22) Filed: Sep. 14, 2023

(65) Prior Publication Data

US 2024/0092293 A1    Mar. 21, 2024

(30) Foreign Application Priority Data

Sep. 16, 2022    (DE) ..................... 10 2022 123 845.8

(51) Int. Cl.
*B60R 16/037*        (2006.01)
*B60H 1/00*         (2006.01)
(Continued)

(52) U.S. Cl.
CPC ..... *B60R 16/0373* (2013.01); *B60H 1/00878* (2013.01); *B60H 3/0035* (2013.01);
(Continued)

(58) Field of Classification Search
CPC ............ B60R 16/0373; B60R 16/0231; B60R 16/0237; B60R 16/037; B60H 1/00878;
(Continued)

(56) References Cited

U.S. PATENT DOCUMENTS

| | | | |
|---|---|---|---|
| 4,655,505 A | | 4/1987 | Takayoshi et al. |
| 5,868,687 A | * | 2/1999 | Tedesco ................... A61H 1/00 |
| | | | 601/56 |
| 9,539,944 B2 | | 1/2017 | Tzirkel-Hancock et al. |
| 11,240,988 B2 | | 2/2022 | Mergl et al. |

(Continued)

FOREIGN PATENT DOCUMENTS

DE    10 2015 109 067 A1    12/2015
DE    10 2016 211 718 A1    1/2018
(Continued)

OTHER PUBLICATIONS

German Office Action for Application No. 10 2022 123 845.8, dated May 12, 2023 with English Translation.

*Primary Examiner* — Michael E Teitelbaum
(74) *Attorney, Agent, or Firm* — JK Intellectual Property Law, PA

(57)            ABSTRACT

A method for controlling two or more comfort functions of a vehicle uses a controller, wherein a first comfort function is provided by a pneumatic massage system of a vehicle seat including one or more air cushions and an air supply system for individual air impingement of the one or more air cushions, and wherein a second comfort function is provided by an electromechanical vibration system of the vehicle seat independent from the pneumatic massage system and including one or more individually controllable electromechanical vibration devices. The method includes: analyzing a provided audio or video file taking the provided comfort functions into account; orchestrating the audio or video file by generating individual control signals for each comfort function the audio or video file after the analyzing; and synchronized transmitting the individual control signals to the corresponding comfort functions, whereby each comfort function is controlled by an individually assigned one of the individual control signals.

25 Claims, 1 Drawing Sheet

(51) Int. Cl.

| | | |
|---|---|---|
| *B60H 3/00* | (2006.01) | |
| *B60N 2/90* | (2018.01) | |
| *B60Q 3/80* | (2017.01) | |
| *B60Q 9/00* | (2006.01) | |
| *B60R 16/023* | (2006.01) | |

(52) U.S. Cl.
CPC ........... *B60H 3/0071* (2013.01); *B60N 2/976* (2018.02); *B60Q 3/80* (2017.02); *B60Q 9/00* (2013.01); *B60R 16/0231* (2013.01); *B60R 16/0237* (2013.01); *B60N 2230/10* (2023.08)

(58) Field of Classification Search
CPC .... B60H 3/0035; B60H 3/0071; B60N 2/976; B60N 2230/10; B60Q 3/80; B60Q 9/00
See application file for complete search history.

(56) References Cited

U.S. PATENT DOCUMENTS

| | | | |
|---|---|---|---|
| 2004/0097851 A1 | 5/2004 | Inada et al. | |
| 2020/0108759 A1* | 4/2020 | Rendel | B60N 2/976 |
| 2021/0110257 A1* | 4/2021 | Shin | H04N 21/4394 |
| 2021/0228440 A1 | 7/2021 | Mergl et al. | |
| 2022/0378652 A1* | 12/2022 | Ju | A61H 7/004 |

FOREIGN PATENT DOCUMENTS

| | | |
|---|---|---|
| DE | 10 2016 217 354 A1 | 3/2018 |
| DE | 10 2017 220 183 A1 | 5/2019 |
| DE | 10 2017 220 184 A1 | 5/2019 |
| DE | 10 2018 200 133 A1 | 7/2019 |
| EP | 3 708 134 A1 | 9/2020 |

* cited by examiner

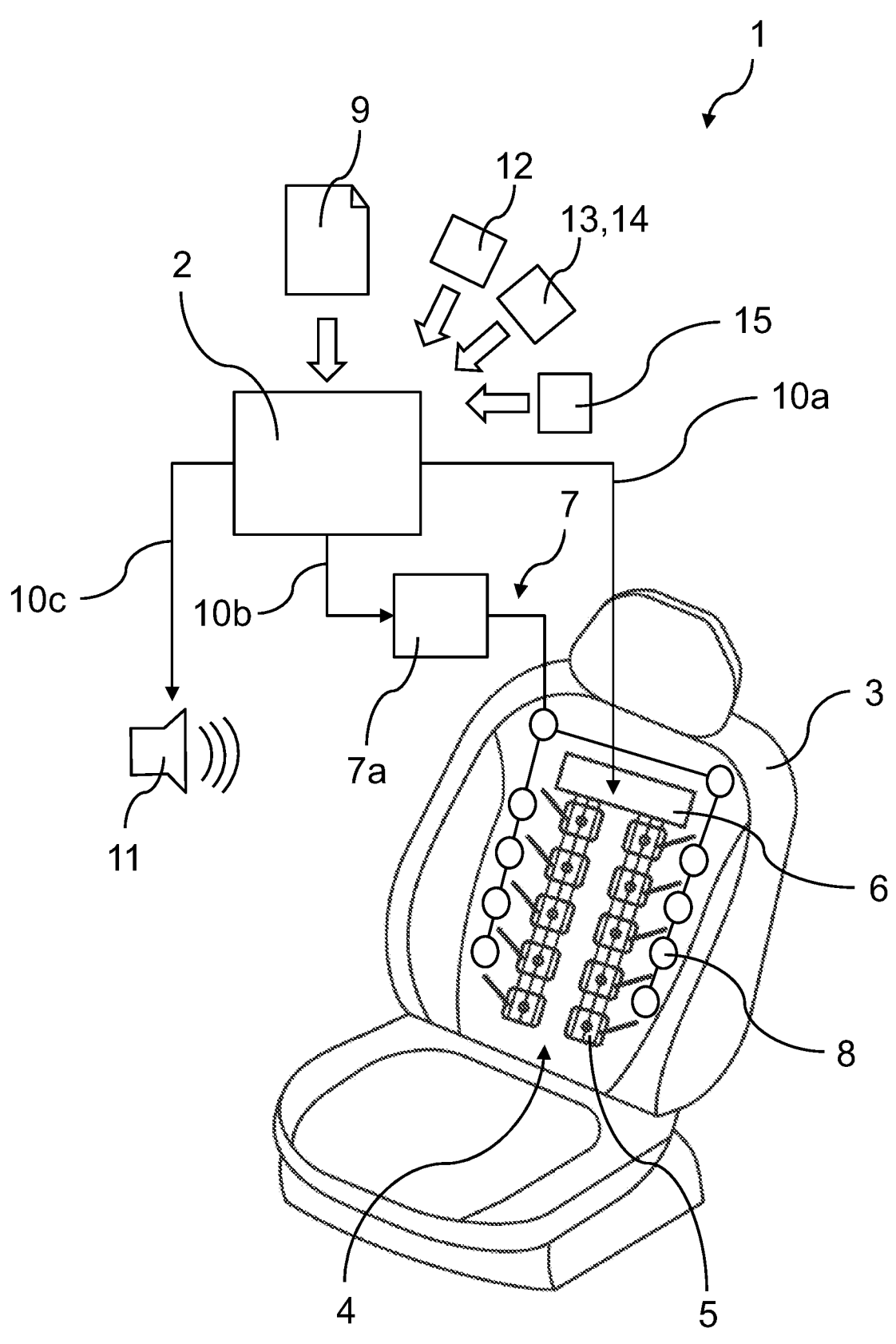

METHOD FOR CONTROLLING TWO OR MORE COMFORT FUNCTIONS OF A VEHICLE AND VEHICLE DEVICE

CROSS-REFERENCE TO RELATED APPLICATIONS

The present application claims the benefit of German Patent Application No. DE 10 2022 123 845.8, filed Sep. 16, 2022, and incorporated by reference herein.

TECHNICAL FIELD

The disclosure pertains to a method for controlling two or more comfort functions of a vehicle by means of a controller and vehicle equipment to carry out the method.

BACKGROUND

Massage systems in vehicle seats are known, in particular, as the comfort function of a vehicle. Such massage systems use air cushions in the seat structure that are filled and vented in cycles. Here, smaller air cushions serve especially for selective massage, larger air cushions serve especially for repositioning the body of a person sitting on the seat.

It is furthermore known that mechanical systems with electromechanical vibration elements are arranged in the vehicle seat. For example, motors are used as electromechanical vibration elements.

It is known from DE 10 2016 217 354 A1 that a vibration massage unit consisting of an electric drive and a powered unbalance mass is provided in vehicle seat elements.

It is known from DE 10 2016 211 718 A1 that motors in a massage device provided in a vehicle seat are controlled by a controller based on an acoustic maintenance signal.

It is known from DE 10 2017 220 184 A1 that an electromotive massage device of a power vehicle seat, which includes a massage drive with an electric motor, is controlled by means of the time derivative of an audio signal by generating a control signal for the electric motor by means of the time derivative and the electric motor is impinged herewith.

The disadvantage in the known methods is the focusing on the massage as such. The potential from the interaction of two or more different comfort functions that results when utilizing the respective possibilities of each comfort function is not utilized.

SUMMARY

The task of the disclosure is to specify a new method to control two or more comfort functions of a vehicle by means of a controller and vehicle equipment to carry out this method. In particular, the new method should utilize the potential that results from an interaction of two or more different comfort functions when the respective possibilities of each comfort function are utilized.

This task is solved, with regard to the method, by a method having the features discussed below and, with regard to the vehicle equipment, by a vehicle equipment having the features discussed below. Advantageous designs and further developments are specified in the corresponding dependent claims.

The method according to the disclosure for controlling one or more comfort functions of a vehicle by means of a controller assumes that a first comfort function of the comfort functions is provided by a pneumatic massage system of a vehicle seat that comprises one or more air cushions and an air supply system for the individual air impingement of the air cushion(s), and that a second comfort function of the comfort functions is provided by an electro-mechanical vibration system of the vehicle seat independent from the pneumatic massage system that includes one or more individually controllable electromechanical vibration devices. An embodiment provides that the air cushions of the pneumatic massage system be arranged only in the area of an A-surface of the vehicle seat, whereby an A-surface is a surface of the vehicle seat facing the vehicle occupant. An embodiment of the disclosure can also provide that the vibration devices be installed in the foam or upholstery of the vehicle seat and/or be arranged on a rear suspension in the vehicle seat.

Here, the controller can be provided as an independent controller in addition to other controllers of the vehicle and having several parts if necessary. However, it is also possible for the controller to be the central controller of the vehicle, i.e., the central computer of the vehicle, upgraded by means of a respective software to implement the steps provided according to the disclosure that are explained below and/or to control the various comfort functions. The individual comfort functions comprise then at least essentially only the hardware, for example actuators, their control and the processing of all data then takes place in the central controller of the vehicle. Only the driver units to move the actuators can be provided in the hardware of the comfort functions if necessary.

The method according to the disclosure comprises the following method steps:

analysis of a provided audio or video file taking the provided comfort functions into account, orchestration of the audio or video file in that, starting from the audio or video file and its analysis, individual control signals for each comfort function are generated, and synchronized transmission of the individual control signals to the respective comfort functions, whereby each comfort function is controlled by the assigned individual control signal.

Orchestration is understood to be the assignment of an acoustic piece, in this case as audio or video file, to individual instruments, here specifically the provided comfort functions. This method can also be described as instrumentation. After the orchestration, the individual instruments, here the comfort functions, can play the acoustic piece together, specifically through the synchronized transmission of the control signals generated in the orchestration. This can take place in parallel to playing the audio piece through a sound equipment of the vehicle, for example. Here, the original version of the audio piece can be played with the sound equipment, but playing back a version adapted in the orchestration is possible as well.

The air cushions of the massage system can be arranged in various positions of the vehicle seat such as in the back rest and in the seat cushion and carry out the respective various functions. For example, several air cushions in the back rest can be arranged to the left and right of a spine of a vehicle occupant, for instance in the shoulder region, breast region and lumbar region. Likewise, several air cushions can be arranged in the seat cushion. Air cushions can also be arranged in the lateral areas of the back rest and/or of the seat cushion. Through individual, coordinated control, i.e., air impingement of the air cushions by means of the air supply system, different effects and/or actions can be elicited in a vehicle occupant sitting on a seat, for instance a massage effect by stimulation of certain muscles and/or mobilization of the back, especially the spine, in order to counteract tensions and signs of fatigue, thereby increasing comfort. A lumbar support and/or a lateral support of a vehicle occupant seating on the seat can also be accomplished or changed during the control.

Analogously, the electromechanical vibration devices of the vibration systems can also be arranged in various places of the vehicle seat and elicit various effects and/or actions in a vehicle occupant through individual, coordinated control.

Consequently, the individual controllability of several air cushions and/or several vibration devices in the orchestration of the audio or video file and the generation of the individual control signals for the massage system or vibration system can be taken into account.

According to a first embodiment of the method according to the disclosure, the control signal of the second comfort function can be characterized by the electromechanical vibration system of the percussion parts, while the control signal of the first comfort function with the pneumatic massage system takes into account the comparatively low frequencies of the massage system that are feasible and brings about a low-frequency, coordinated control of the individual air cushions adapted to the audio or video file, thus ensuring a background experience for the vehicle occupant that is appropriate for the audio or video file. In addition, the original audio or video file can be played back unchanged or likewise orchestrated with regard to the remaining instruments, therefore without percussion part, for example, via the audio system of the vehicle. Generally speaking, every vibration device of the vibration system can be basically controlled like a loudspeaker, especially with numerous superimposed frequencies, simultaneously constituting in this way different instruments worked out from the audio or video file in the analysis and orchestration. For example, a vibration device can reproduce low frequencies and hence low tones (e.g., of a bass) simultaneously and thus reproduce drums, for example, superimposed with other frequencies.

According to a second embodiment of the method according to the disclosure, the control signal of the second comfort function with the electromechanical vibration can take over a drum solo as part of the provided audio or video file, whereby the control signal is formed in such a way that every vibration device of the vibration system is individually controlled according to the part of the audio or video file to be assigned in proportion to that of an individual drum and therefore the vibration system as a whole with its vibration devices distributed over the seat corresponds to the drum when the audio or video file is played back. When the audio or video file is played back in parallel via the sound system of the vehicle, the drum solo can be faded out or also played back with it.

Thus, a key advantage of the method according to the disclosure lies in the interaction of the comfort functions resulting from the orchestration. This allows a tailored and therefore integral effect of the comfort functions on the vehicle occupant(s), thereby leading, for example, to an integrated and harmonious massage experience, that possibly—apart from feeling or sensing the massage—also includes additional senses of the vehicle occupant(s) such as the senses of hearing and/or seeing and/or smelling. Hence, the method according to the disclosure takes advantage of the potential resulting from the interaction of two or more different comfort functions utilizing the respective possibilities of each comfort function.

Another advantage that results from the interaction of the comfort functions is the variety for the vehicle occupant(s). Previous comfort functions, especially those based on massage systems, operate only for themselves. This leads to a habituation effect for the vehicle occupant(s) because the programs being executed become known after being used a certain time. By integrating several comfort functions and/or the corresponding devices to provide these comfort functions, especially those of many and/or diverse actuators in the vehicle, for example in the vehicle seat, the possibilities provided for analyzing the audio or video file multiply, and can be considered accordingly in the orchestration of the audio or video file. Thus, for the analysis and orchestration by the controller, particularly of an intelligent logic stored in the controller, many different possibilities that lead to a surprise effect and therefore to variety in the vehicle occupant(s) result from this. The individual control signals generated here are then transmitted in a synchronized way to the respective comfort functions, especially to the equipment or equipment units to provide these comfort functions.

A further development provides that the supplied audio or video file is a music piece and the instruments or instrument groups involved are taken into account in the analysis and orchestration, and that in the orchestration of the first comfort function, a first instrument or a first instrument group, and of the second comfort function a second instrument or a second instrument group are assigned, and the individual control signal of the respective comfort function is generated starting from the part of the audio or video file pertaining to the instrument or instrument group assigned in each case. In the analysis and orchestration, the properties of the music piece can be taken into account. For example, the music genre and/or the dynamics and/or the pace and/or the expression and/or the way of playing can be considered as properties of the music piece.

For the analysis and orchestration, the properties of the music piece to be considered can be taken from external sources and/or from a database stored in or for the controller and/or from the audio or video file itself or from the files assigned to the audio or video file. Therefore, in the analysis of the audio or video file, not only self-collected data and information can be taken into account, but already available information about the properties of the music piece can be used as well.

External sources can be contacted via an internet connection. External sources that can be taken into consideration are streaming services or music databases, for example.

An embodiment of the method according to the disclosure provides that in the analysis and orchestration as well as in the generation of the individual control signals, the control signal or the respectively other individual control signals are taken into account, so that all provided comfort functions are controlled by means of the individual control signals in a coordinated and/or complementary fashion.

In the analysis and orchestration, the properties of the provided comfort functions can be taken into account. A property of the first comfort function can be, for example, the consideration of the feasible pulsation frequencies of the pneumatic massage systems. A property of the second comfort function can be, for example, the consideration of the feasible vibration frequencies of the electromechanical vibration devices.

In addition, it can also be taken into account that the feasible pulse frequencies of the pneumatic massage systems are lower than the feasible vibration frequencies of the electromechanical vibration devices. Thus, the pneumatic massage system and the electromechanical vibration devices supplement one another with regard to the feasible frequencies.

The feasible frequency of the pneumatic massage by air cushions is, for example, 0.5 to 4 Hz, possibly also up to 15 Hz. The feasible frequencies of the electromechanical vibration devices can be between 5 and 20 Hz, possibly also up to 50 Hz.

Owing to the comparatively low feasibility of the massage system frequencies of the first comfort function, it is possible to create a background experience in the vehicle occupant appropriate to the audio or video file by a low-frequency controlling of the individual air cushions adapted to the audio or video file in a coordinated way, whereas fast and loud parts can be implemented very well by the vibration system of the second comfort function. The low-frequency pulsation of the massage system can thus create a framework for the music and/or the vibration system controlled by a high frequency and the resulting effect it evokes on the vehicle occupant. The combination then leads to a holistic experience or perception and thus evokes the corresponding mood in the vehicle occupant. The adaptation of the low-frequency pulsation of the massage system when the control signals to the audio or video file are generated can take place in such a way, for example, that the pulsation takes place according to the mood of the respective audio or video file music, fast or slow, soothing, or vitalizing, and is therefore adapted to the respective music. For example, a fast pulsation massage can take place in fast music, and a corresponding slow massage in slow music.

Pulsation massage is understood to be, in particular, a massage in which a low-frequency vibration of the filled air cushions is generated. Such a low-frequency vibration lies within the range of 0.5 Hz to 1000 Hz, especially between 1 Hz and 100 Hz, preferably below 70 Hz. Typical frequencies lie between 1 Hz and 20 Hz. This is made possible, for example, by a vibration generator arranged between the air supply system and air cushion that is fluidically connected to the air cushion in order to impinge the filled air cushion with a pressure vibration. Once the air cushion is filled with the desired filling volume, the pressure vibration can be generated exclusively via the vibration generator. In a vehicle seat, this pulsation can be restricted, for example, to certain air cushions and thus to certain areas of the vehicle seat, taking place for example only with air cushions arranged in a middle area of a backrest and/or of a seat cushion of the vehicle seat.

A further development provides that during the generation of the control signal for the first comfort function, an individual controllability of several air cushions of the massage system and/or the arrangement and distribution of the air cushions of the massage system in the vehicle seat is taken into account. Alternatively or additionally, when the control signal for the second comfort function is generated, the individual controllability of several electromechanical vibration devices of the vibration system are taken into account. For example, air cushions and/or vibration devices can be arranged in different areas of the back rest, in the seat surface and/or in lateral supports of the seat and individually controlled via the control signal of the first comfort function or second comfort function.

It can additionally be provided for the vehicle seat to have several surface areas to which in each case at least one air cushion of the massage system and/or at least one electromechanical vibration device of the vibration system is assigned. If the provided audio or video file is a music piece, then the different instruments or instrument groups or frequencies involved in the music piece can be taken into account in the analysis and orchestration by assigning to the air cushion(s) and/or the electromechanical vibration devices of a surface area another instrument or another instrument group or another frequency in the orchestration than that of the air cushion(s) and/or the electromechanical vibration device(s) of another surface area. In the generation of the control signal for the first comfort function and/or in the generation of the control signal for the second comfort function, the individual control of the air cushions and/or of the electromechanical vibration devices of the various surface areas is then taken into account in such a way that the generated control signals include this individual control.

As a result of this, the different instruments or instrument groups or frequencies of a music piece can be reproduced in a distributed way over the surface of the vehicle seat, for example split up on the front side of the back rest, the seat surface and/or the respective lateral surfaces. Here, reproduced is understood to be especially the corresponding inflating and venting of the air cushions or the corresponding vibration of the vibration devices. For example, the massage effect of the different surface areas of the seat can be spatially split up in this way, for example by assigning the various instruments or instrument groups or frequencies.

In the method according to the disclosure, the individually entered wishes of a vehicle occupant or those selected from a given selection can be taken into account in the analysis and orchestration.

A type of massage selected by a vehicle occupant can also be taken into account in the analysis and orchestration. Furthermore, in the analysis and orchestration, the data of the vehicle occupant pertaining, for example, to his/her condition and/or mood can be taken into account, those from an electronic device that records the data of the vehicle occupant are transmitted via an internet or wireless connection. For example, mobile device or smart watch data (e.g., calendar information about past or upcoming appointments, workout data, pulse data and/or stress level data) can be transmitted and taken into account by the controller in the analysis and orchestration. If, for example, the future vehicle occupant approaches or enters the vehicle, his/her condition and/or his/her mood can be recorded, as exemplarily described above, and a music piece and/or a type of massage be offered from the selection.

An exemplary situation is a break during a journey to charge an electric vehicle, for example. Then, in the analysis and orchestration, through the corresponding input and/or selection by the vehicle occupant and/or through the respective data evaluation, the expected duration of the break and/or the target position of the vehicle occupant for the break, such as relaxation and/or a power nap, can be taken into account. The vehicle occupant is then relaxed for as long as this break lasts, which can be the charging duration of the electric vehicle, by means of comfort functions that heat or vent the vehicle seat, for example, and/or the right program combining music, massage and/or lighting runs. Here, if necessary, a power nap of the vehicle occupant can also be supported. For example, the comfort functions can be controlled in such a way that massage and/or music become increasingly invigorating towards the end of the break and/or the temperature of the vehicle seat is lowered through venting, for example, resulting in the reawakening of the vehicle occupant.

According to an embodiment, surrounding noises outside and/or inside the vehicle and/or the surrounding brightness can be taken into account in the analysis and orchestration. For example, in the analysis and orchestration, the controller can take into account that surrounding noises outside and/or inside the vehicle are possibly compensated. Furthermore, the surrounding brightness, such as sunshine and/or cloudy weather and/or daylight and/or nocturnal darkness, can be taken into account in the analysis and orchestration.

A further development provides that a vehicle occupant selects a music piece or a playlist by means of an input device of the controller and the selected music piece or a music piece from the selected playlist is made available as audio or video file for the analysis and orchestration. Generally, the music pieces are already fully available in the selection, so that the analysis can take place immediately and thus almost directly after the selection, at least within a few seconds, the orchestration implemented and consequently the massage and/or vibration adapted to the audio or video file can take place.

An embodiment provides that a vehicle occupant selects a type of massage of the first comfort function and/or a vibration pattern of the second comfort function by means of an input device. On the basis of this selection by the vehicle occupant, the controller, in turn, selects a music piece or a playlist or suggests a music piece or playlist to the vehicle occupant for selection. The selected music piece or a music piece of the selected playlist is then provided as audio or video file for the analysis and orchestration.

The electromechanical vibration devices can in each case include a vibration generator and a carrier part connected to the vibration generator, on which the mechanical vibrations generated by the vibration generator are transferred. The carrier part can be especially a carrier plate. It can be provided that the electromechanical vibration devices generate audible and perceptible vibrations for the vehicle occupant.

The pneumatic massage system can have between the air supply system and the air cushion(s) at least one vibration generator fluidically connected to the air cushion(s) that impinges the air cushion(s) with a pressure vibration. When the control signal for the first comfort function is generated, not only can the individual controllability of several air cushions be taken into account in this case, but also that the air cushions formed accordingly can be separately influenced via the air supply system and the vibration generator and are consequently separately controllable via the control file with regard to both aspects. In this way, it is possible to superimpose, for example, a lower main pulsation frequency that comes from the air supply system with a higher secondary pulsation frequency that comes from the vibration generator, whereby the amplitude of the main pulsation frequency is typically larger than the amplitude of the secondary pulsation frequency. According to an embodiment, an individual vibration generator can be assigned to each air cushion. Also, each vibration generator can include an air chamber with varying volume and a drive element for changing the volume in the air chamber, whereby the air chamber is connected to the assigned air cushions.

According to a further development of the method, apart from the first comfort function and the second comfort function, one or more additional comfort functions can be provided and taken into account in the analysis and orchestration of the audio or video file and be controlled by individual control signals generated here. The additional comfort functions can be intended, for example, for increasing the comfort and/or the well-being and/or the relaxation and/or the attention and/or the safety of at least one vehicle occupant.

As result of the orchestration, the most varied effects or impressions of a vehicle occupant can be elicited in a combined way, for example. For instance, in addition to general massage and vibration, special effects (e.g., activation) in the lumbar and/or pelvic region can be elicited. The lateral support of a seated vehicle occupant can also be included such as light effects, heat/cold (can be influenced via an air conditioning unit of the vehicle and/or via a seat air conditioning) and smells. Even the music can be played back, if necessary in adapted fashion, with regard to the volume and/or the controlled loudspeakers, for example.

Examples of additional comfort functions that can be provided:

Scenting by means of one or more scenting devices, and/or

Air ionization by means of one or more ionization devices, and/or

Seat ventilation by means of one or more ventilation devices, and/or

Seat heating by means of one or more heaters, and/or

Air conditioning by means of the vehicle air conditioning unit of the vehicle and/or of the vehicle seat, and/or Humidity control by means of one or more humidity controllers of the vehicle, and/or Ambient lighting by means of the ambient lighting system of the vehicle, and/or Picture and/or video playback by means of one or more vehicle displays, and/or Sonication of the vehicle interior by means of a vehicle sound system, and/or Lighting of the vehicle interior by means of vehicle interior lighting system, and/or Movement at least of partial areas of the vehicle seat by means of one or more vehicle seat adjusters.

The vehicle equipment according to the disclosure is intended carrying out the method according to the disclosure. This method is intended for controlling two or more comfort functions of a vehicle. The vehicle equipment comprises a controller and at least one vehicle seat. The vehicle seat has a pneumatic massage system to provide a first comfort function that comprises one or more air cushions and an air supply system for the individual air impingement of the air cushion(s). The vehicle seat also has an electromechanical vibration system independent from the pneumatic massage system to provide a second comfort function that comprises one or more individually controllable electromechanical vibration devices. The controller is set up to analyze a provided audio or video file taking the provided comfort functions into account, to orchestrate the audio or video file by generating individual control signals for each comfort function from the audio or video file and their analysis, and to transmit the individual control signals to the corresponding comfort functions in a synchronized way, whereby each comfort function is controlled by the assigned individual control signal.

The audio or video file can be a music piece, for example.

The vehicle equipment can include an input device for a vehicle occupant with which the vehicle occupant can directly select, for example, a music piece and/or a type of massage of the first comfort function and/or a vibration pattern of the second comfort function. In the case mentioned first, the controller can select a massage and/or vibration program adapted to the music piece or suggest a selection to the vehicle occupant and then take the selected program into account in the analysis and orchestration. In this case, the controller can select a music piece or a playlist from the selection or suggest a selection to the vehicle occupant and provide the selected music piece or a music piece from the selected playlist as audio or video file for the analysis and orchestration.

The electromechanical vibration devices can in each case include a vibration generator and a carrier part connected to the vibration generator onto which the mechanical vibrations generated by the vibration generator are transmitted. The carrier part can be especially a carrier plate.

The pneumatic massage system can have between the air supply system and the air cushion(s) at least one vibration generator fluidically connected to the air cushion(s) that impinges a pressure vibration onto the air cushion(s). In particular, an individual vibration generator can be assigned to each air cushion. Each vibration generator can include an air chamber with varying volume and a drive element to change the volume in the air chamber, whereby the air chamber is connected to the assigned air cushion.

Apart from the first comfort function and the second comfort function, the vehicle equipment can provide one or several additional comfort functions that are taken into account in the analysis and orchestration of the audio or video file by means of the controller and controlled by individual control signals generated here. The additional comfort functions can be especially intended for increasing the comfort and/or well-being and/or relaxation and/or attention and/or safety of at least one vehicle occupant.

For example, to implement the additional comfort functions, the following can be provided:

one or more scenting devices, and/or
one or more ionization devices, and/or
one or more ventilation devices, and/or
one or more heaters for heating the seat, and/or
an air conditioning unit of the vehicle and/or vehicle seat, and/or
one or more humidity controllers of the vehicle, and/or
an ambient lighting system of the vehicle, and/or
one or more displays for image display and/or video playback, and/or
a sound system of the vehicle, and/or
a vehicle interior lighting system, and/or
one or more vehicle seat adjusters for moving at least some areas of the vehicle seat.

BRIEF DESCRIPTION OF THE DRAWINGS

The disclosure will be explained in more detail below, also with regard to additional features and advantages by describing an embodiment and with reference to the enclosed schematic drawing.

FIG. 1 shows a schematic representation of an example of a vehicle equipment according to the disclosure to carry out an embodiment of a method according to the disclosure.

DETAILED DESCRIPTION

FIG. 1 shows a vehicle equipment 1 to carry out an embodiment of a method according to the disclosure. This method is intended for controlling two or more comfort functions of a vehicle. To do this, the vehicle equipment 1 includes a controller 2 set up accordingly and a vehicle seat 3.

The vehicle seat 3 has a pneumatic massage system 4 to provide a first comfort function. The massage system 4 includes several air cushions 5 and one air supply system 6 for the individual air impingement of the air cushions 5.

In addition, the vehicle seat 3 has an electromechanical vibration system 7 independent from the pneumatic massage system 4 to provide a second comfort function that includes several electromechanical vibration devices 8 individually controllable by a controller 7a of the vibration system 7.

Furthermore, the vehicle equipment includes a sound system 11 as an example of a third comfort function.

The controller 2 is set up to analyze a provided audio or video file 9 taking the provided comfort functions into account, to orchestrate the audio or video file 9 by generating individual control signals for each comfort function starting from the audio or video file 9 and their analysis, and transmit the individual control signals to the corresponding comfort functions in a synchronized way, whereby each comfort function is controlled by the assigned individual control signal. In the example shown, the pneumatic massage system 4 as first comfort function is controlled by a first control signal 10a, the electromechanical vibration system 7 as second comfort function by a second control signal 10b, and the sound system 11 as third comfort function by a third control signal 10c.

In the analysis and orchestration of the audio or video file 9 by the controller 2, the data 12 of a vehicle occupant that are also transmitted to the controller 2, for example, via an internet or wireless connection from an electronic device that records the vehicle occupant data are also taken into account in the example shown.

Moreover, surrounding noises 13 and/or the surrounding brightness 14 can also be taken into account in the analysis and orchestration of the audio or video file 9 by the controller 2.

FIG. 1 shows the provision of an input device 15 of the controller 2. By means of this input device 2, a vehicle occupant can select a music piece or a playlist, for example. The selected music piece or a music piece from the selected playlist is then provided as audio or video file 9 for the analysis and orchestration by the controller 2. Alternatively or additionally, the vehicle occupant can also select a type of massage of the massage system 4 and/or a vibration pattern of the vibration system 7 by means of the input device 15. Using this selection, the controller 2 selects a music piece or a playlist or suggests a music piece or a playlist to the vehicle occupant from the selection. The selected music piece or a music piece from the selected playlist is then provided as audio or video file 9 for the analysis and orchestration by the controller 2.

LIST OF REFERENCE CHARACTERS

1 Vehicle equipment
2 Controller
3 Vehicle seat
4 Pneumatic massage system
5 Air cushion
6 Air supply system
7 Electromechanical vibration system
7a Controller of the vibration system 7
8 Electromechanical vibration devices
9 Audio or video file
10a First control signal
10b Second control signal
10c Third control signal
11 Sound system
12 Vehicle occupant data
13 Surrounding noises
14 Surrounding brightness
15 Input device

The invention claimed is:

1. A method for controlling two or more comfort functions of a vehicle using a controller, wherein a first comfort function is provided by a pneumatic massage system of a vehicle seat including one or more air cushions and an air supply system for the individual air impingement of the one or more air cushions, and wherein a second comfort function is provided by an electromechanical vibration system of the vehicle seat independent from the pneumatic massage system and including one or more individually controllable electromechanical vibration devices, the method comprising the following steps:

analyzing a provided audio or video file taking the provided comfort functions into account;

orchestrating the audio or video file by generating individual control signals for each comfort function the audio or video file after the analyzing; and synchronized transmitting the individual control signals to the corresponding comfort functions, whereby each comfort function is controlled by an individually assigned one of the individual control signals, wherein the provided audio or video file is a music piece and the instruments or instrument groups involved are taken into account in the analysis and orchestration, and in the orchestration of the first comfort function, a first instrument or a first instrument group, and of the second comfort function a second instrument or second instrument group are assigned, and the individual control signal of the respective comfort function is generated starting from the part of the audio or video file that pertains to the instrument assigned in each case or the instrument group assigned in each case.

2. The method according to claim 1, wherein the properties of the music piece are taken into account in the analysis and orchestration.

3. The method according to claim 2, wherein the music genre and/or the dynamism and/or the pace and/or the expression and/or the way it is played are taken into account as properties of the music piece.

4. The method according to claim 2, wherein the properties of the music piece to be taken into account for the analysis and orchestration are taken from external sources and/or from a database stored in or for the controller and/or from the audio or video file itself or from files assigned to the audio or video file.

5. The method according to claim 1, wherein in the analysis, orchestration and generation of the individual control signals, the control signal or the respective other individual control signals are taken into account, so that the control of all provided comfort functions using the individual control signals takes place in a coordinated and/or complementary way.

6. The method according to claim 1, wherein the properties of the provided comfort functions are taken into account in the analysis and orchestration.

7. The method according to claim 6, wherein feasible pulsation frequencies of the pneumatic massage system are taken into account as a property of the first comfort function, and/or feasible vibration frequencies of the electromechanical vibration devices as a property of the second comfort function.

8. The method according to claim 7, wherein it is taken into account that the feasible pulse frequencies of the pneumatic massage system are lower than the feasible vibration frequencies of the electromechanical vibration devices.

9. The method according to claim 1, wherein in the generation of the control signal for the first comfort function, an individually controllability of several air cushions of the massage system and/or an arrangement and distribution of the air cushions of the massage system in the vehicle seat is taken into account; and/or in the generation of the control signal for the second comfort function individual controllability of several electromechanical vibration devices of the vibration system is taken into account.

10. The method according to claim 9, wherein the vehicle seat has several surface areas to which in each case at least one air cushion of the massage system and/or at least one electromechanical vibration device of the vibration system is assigned;

the provided audio or video file is a music piece and in the analysis and orchestration various instruments or instrument groups or frequencies involved in the music piece are taken into account, in that in the orchestration another instrument or another instrument group or another frequency is assigned to the air cushion(s) and/or the electromechanical vibration device(s) of a surface area than that of the air cushions(s) and/or the electromechanical vibration device(s) of another surface area; and in the generation of the control signal for the first comfort function and/or in the generation of the control signal for the second comfort function the individual control of the air cushions and/or of the electromechanical vibration devices of the various surface areas is taken into account in such a way that the generated control signals include this individual control.

11. The method according to claim 1, wherein individually entered wishes of a vehicle occupant or those selected from a given selection are taken into account in the analysis and orchestration.

12. The method according to claim 1, wherein a type of massage selected by a vehicle occupant is taken into account in the analysis and orchestration.

13. The method according to claim 1, wherein vehicle occupant data transmitted to the controller via an internet or a wireless connection from an electronic device that records the vehicle occupant data are taken into account in the analysis and orchestration.

14. The method according to claim 1, wherein surrounding noises outside and/or inside the vehicle and/or surrounding brightness are taken into account in the analysis and orchestration.

15. The method according to claim 1, wherein a vehicle occupant selects a music piece or a playlist using an input device of the controller and the selected music piece or a music piece from the selected playlist is provided as audio or video file for the analysis and orchestration.

16. The method according to claim 1, wherein using an input device, a vehicle occupant selects a type of massage of the first comfort function and/or a vibration pattern of the second comfort function and using this selection, the controller (2) selects a music piece or a playlist or suggests one to the vehicle occupant from the selection and the selected music piece or a music piece of the selected playlist is provided as audio or video file for the analysis and orchestration.

17. The method according to claim 1, wherein the electromechanical vibration devices include in each case one vibration generator and one carrier part connected to the vibration generator on which the mechanical vibrations generated by the vibration generator are transferred.

18. The method according to claim 1, wherein the electromechanical vibration devices generate audible and perceptible vibrations for the vehicle occupant.

19. The method according to claim 1, wherein the pneumatic massage system has at least one vibration generator between the air supply system and the air cushion(s) that is fluidically connected to the air cushion(s) that supplies the air cushion(s) with a pressure vibration.

20. The method according to claim 19, wherein an individual vibration generator is assigned to each air cushion.

21. The method according to claim 19, wherein each vibration generator includes one air chamber with varying volume and a drive element for changing the volume in the air chamber, whereby the air chamber is connected to the assigned air cushion.

22. The method according to claim 1, wherein apart from the first comfort function and the second comfort function, one or more additional comfort functions are provided and taken into account in the analysis and orchestration of the audio or video file and controlled here by individually generated control signals.

23. The method according to claim 22, wherein the additional comfort functions to increase the comfort and/or well-being and/or relaxation and/or attention and/or safety are intended for at least one vehicle occupant.

24. The method according to claim 22, wherein the following are provided as additional comfort functions:
  scenting using one or more scenting device; and/or
  air ionization using one or more ionization devices; and/or
  seat ventilation using one or more ventilation devices; and/or
  seat heating using one or more heaters; and/or
  air conditioning using the air conditioning unit of the vehicle and/or of the vehicle seat; and/or
  humidity control using one or more humidity controllers of the vehicle; and/or ambient lighting using the ambient lighting system of the vehicle; and/or
  picture and/or video playback using one or more displays of the vehicle; and/or
  sonication of the vehicle interior using a sound system of the vehicle; and/or
  lighting of the vehicle interior using the vehicle interior lighting system; and/or
  movement of at least some areas of the vehicle seat using one or more vehicle seat adjusters.

25. Vehicle equipment to carry out the method according to claim 1,
  wherein the method controls two or more comfort functions of a vehicle;
  wherein the vehicle equipment includes one controller and at least one vehicle seat;
  wherein the vehicle seat has a pneumatic massage system to provide a first comfort function that includes one or more air cushions and one air supply system for the individual air impingement of the air cushion(s);
  wherein the vehicle seat has an electromechanical vibration system independent from the pneumatic massage system to provide a second comfort function that includes one or more individually controllable electromechanical vibration devices; and
  wherein the controller is configured to:
  analyze a provided audio or video file taking the provided comfort functions into account;
  orchestrate the audio or video file by generating individual control signals for each comfort function, starting from the audio or video file and its analysis; and
  transmit the individual control signals to the corresponding comfort functions in a synchronized way, wherein each comfort function is controlled by the assigned individual control signal.

* * * * *